United States Patent
Russick et al.

(10) Patent No.: US 9,637,202 B2
(45) Date of Patent: May 2, 2017

(54) METHOD OF AND SYSTEM FOR EVACUATING FLUID IN A SEA VESSEL

(71) Applicants: James Russick, Titusville, FL (US); Michael Russick, Titusville, FL (US)

(72) Inventors: James Russick, Titusville, FL (US); Michael Russick, Titusville, FL (US)

( * ) Notice: Subject to any disclaimer, the term of this patent is extended or adjusted under 35 U.S.C. 154(b) by 0 days.

(21) Appl. No.: 14/032,825

(22) Filed: Sep. 20, 2013

(65) Prior Publication Data

US 2014/0048004 A1    Feb. 20, 2014

(51) Int. Cl.
*F04B 49/00* (2006.01)
*B63B 13/00* (2006.01)
*G05D 9/12* (2006.01)
*F04B 49/06* (2006.01)
*F04B 23/02* (2006.01)
*B63J 99/00* (2009.01)

(52) U.S. Cl.
CPC ............ *B63B 13/00* (2013.01); *F04B 23/021* (2013.01); *F04B 49/065* (2013.01); *G05D 9/12* (2013.01); *B63B 2201/26* (2013.01); *B63J 2099/006* (2013.01); *F04B 2203/0201* (2013.01); *F04B 2203/0202* (2013.01); *F04B 2203/0204* (2013.01)

(58) Field of Classification Search
CPC ...... F04B 49/025; F04B 49/04; F04B 23/021; F04B 49/065; F04B 2203/0201; F22D 5/22
USPC .................. 417/36, 40, 44.11, 12, 211.5, 41; 114/183 R; 29/888.08
See application file for complete search history.

(56) References Cited

U.S. PATENT DOCUMENTS

| | | | |
|---|---|---|---|
| 4,171,932 A * | 10/1979 | Miller ................ | F04D 15/0218 307/118 |
| 4,222,711 A * | 9/1980 | Mayer ............................... | 417/7 |
| 4,311,438 A * | 1/1982 | Comstedt ........................ | 417/12 |
| 4,678,403 A * | 7/1987 | Rudy et al. ..................... | 417/12 |
| 4,881,873 A | 11/1989 | Smith et al. | |
| 5,015,152 A * | 5/1991 | Greene .......................... | 417/40 |
| 5,078,577 A * | 1/1992 | Heckman ......................... | 417/2 |
| 5,324,170 A * | 6/1994 | Anastos et al. ................ | 417/12 |
| 5,404,048 A * | 4/1995 | Panner ......................... | 307/118 |
| 5,549,456 A * | 8/1996 | Burrill et al. .................. | 417/12 |
| 5,576,582 A | 11/1996 | White | |
| 6,473,004 B1 | 10/2002 | Smull | |
| 6,715,994 B2 * | 4/2004 | Patel et al. ...................... | 417/12 |
| 7,661,380 B2 | 2/2010 | Waldecker | |
| 7,806,664 B2 | 10/2010 | Patel et al. | |
| 8,024,967 B2 | 9/2011 | Burdi et al. | |
| 8,291,761 B2 | 10/2012 | Burdi et al. | |
| 2004/0213676 A1* | 10/2004 | Phillips et al. ............. | 417/44.11 |
| 2008/0250857 A1* | 10/2008 | Burdi et al. ................. | 73/304 C |
| 2009/0148306 A1 | 6/2009 | Drechsel et al. | |
| 2010/0166570 A1* | 7/2010 | Hampton ........................ | 417/36 |
| 2010/0215511 A1* | 8/2010 | Eller et al. ................... | 417/44.1 |

(Continued)

OTHER PUBLICATIONS

US 7,950,279, 05/2011, Burdi et al. (withdrawn)

*Primary Examiner* — Charles Freay
*Assistant Examiner* — Christopher Bobish

(57) ABSTRACT

A system and method that controls the evacuation of fluid from a sea vessel and configured to prevent turning off the bilge pump during periods of water sloshing. The invention provides a control unit that is adaptable to any size vessel or bilge pump based on a learned experience gained by sensory information.

17 Claims, 12 Drawing Sheets

(56) References Cited

U.S. PATENT DOCUMENTS

| | | |
|---|---|---|
| 2011/0095914 A1* | 4/2011 | Velado et al. ................. 340/984 |
| 2012/0006111 A1* | 1/2012 | Burdi et al. ................. 73/304 R |
| 2013/0140912 A1 | 6/2013 | Nirenberg |
| 2013/0336804 A1* | 12/2013 | Robinson .............. F04B 49/025 417/22 |

* cited by examiner

METHOD OF AND SYSTEM FOR EVACUATING FLUID IN A SEA VESSEL

FIELD OF THE INVENTION

The present invention relates to a system and method for evacuating fluid in a sea vessel, and more in particularly to a system and method that is adaptable to any size vessel or bilge pump based on a learned experience gained by sensory information over time, sensory information including current draw information.

BACKGROUND OF THE INVENTION

A bilge pump is an apparatus used to remove bilge water and other fluid that accumulates in a bilge or vessel of a boat. Bilge pumps are integral to boats in order to avoid accumulating water and sinking. For instance, during the operation of the boat, the bounce of the hull in the water causes water spray to accumulate in the bilge. In addition, water and fluid regularly accumulates in the boat when docked at a boat slip because of, for example, rain, leaks in the hull, and leaks in the engine and/or gas tank. In many instances, if the water is not removed, the water will continue to accumulate until the boat eventually sinks, either while in operation, or while docked at the slip.

In order to facilitate operation of the bilge pump, detection members, such as float switches, probes, or other sensors, are used to detect a threshold level of water accumulation in the vessel. To date, prior art has adopted the approach, as shown in U.S. Patent Publication 2012/0006111, that implements a microprocessor that can be programmed to provide delays for pump turn-on and turn-off when the microprocessor has at least 256 consecutive reads over a 0.286 second time interval. Typically, the prior art has attempted to prevent over cycling of the bilge pump by instituting this consecutive read operation by a microprocessor. It has been found that there are several disadvantages to merely relying on consecutively reading active signals without adjustment. For example, the vessel may include a significant amount of fluid and yet the signal does not remain active because of the sloshing of the fluid and rocking of the boat caused by water current, waves and wind conditions.

The prior art applies various systems and methods for preventing false triggers of water level sensors. During periods of non-use, the boat is secured to the boat slip, which experiences side-to-side rocking and results in fluid sloshing from side-to-side. This side-to-side action causes the sensors, such as a float switch, to turn-on the bilge pump. As a result, various systems have implemented time delays and other methods to prevent continuously turning on the bilge pump before a threshold amount of fluid is contained in the boat hull. However, the combination of fluid slosh, and the evacuation of some fluid through the bilge pump hose by activating the bilge pump, causes prior systems to believe that sufficient water has been evacuated, when in fact it has not. For example, as the boat tilts causing the water to slosh up the inner side wall of the sea vessel, the fluid level sensor may indicate a low water level. For further example, the float switch may drop entirely to the bottom. Thus, the prior systems falsely believe that sufficient fluid has been removed from the vessel, when in fact a significant amount of fluid remains in the vessel. The bilge pump will turn off as a result of both evacuating a portion of the fluid through the bilge pump hose and the side-to-side sloshing of the fluid.

When the bilge pump is turned off, head pressure in the hose is lost which causes the fluid in the bilge hose to drain back into the vessel. One problem results when the fluid in the bilge pump hose drains back into the vessel. Namely, it raises the fluid level in the bilge causing the sensors to again activate the bilge pump. However, because of the slosh of fluid, the pump is immediately shut off either because, by way of example, a float which drops or the bilge pump is spinning in the air causing the current through the bilge pump to drop below a preset threshold current value. Once again the fluid in the bilge pump hose drains back into the vessel. That cycle continues until the battery dies, which puts the boat at risk of sinking. Or alternatively, the sea vessel is connected to an AC power supply, which causes the system to continuously run and waste a significant amount of energy. Furthermore, over running the system causes failures to the bilge pump and sensors. Such failures may include burning out the contacts on a mechanical based sensor, as well as wear and tear on the components.

In addition, the prior art does not disclose a system that actively learns bilge pump run time requirements in order to be integrated with any bilge pump system on any boat or vessel. This new system is also particularly advantageous to prevent both over running and under running of the bilge pump. For example, if the instant system merely measured current draw of the bilge pump to determine whether the bilge is pumping fluid or spinning air, the bilge pump would turn off early because, as the fluid sloshes and/or the boat rocks side-to-side, the bilge pump would spin air despite a significant amount of fluid contained in the boat or vessel.

Accordingly, there is a need for a new bilge pump system that overcomes the problems caused by both over running and under running the bilge pump. There is further a need for a control unit that is adaptable to work with any sized boat and bilge pump, whether implemented either alone or in parallel with an existing system.

SUMMARY OF THE INVENTION

The instant invention advantageously overcomes the drawbacks relating to the loss of head pressure that causes water pumped through a bilge hose to reenter the vessel, which creates a continuous loop of bilge pump activation until the battery has been drained to the point that the bilge pump can no longer evacuate water and other fluids from the sea vessel.

Because of the sloshing of water commonly due to the side-to-side rocking of the boat, if the bilge pump was turned off too early, head pressure in the bilge pump hose would be lost. In which case, the water in the bilge pump hose would drain back into the sea vessel. For example, in many cases, if the instant system was turned off merely from the bilge pump spinning in air, the system would experience a continuous loop that would drain the battery. More specifically, the slosh of the water would briefly cause the bilge pump to spin in air, despite that a significant amount of fluid remains in the sea vessel as it sloshes up the side of the inner wall. For the same reason, as the water sloshes up the side of the inner wall, a low level may be falsely detected by sensors. Therefore, in some prior systems, when one or more sensors indicates a false low level, turning off the bilge pump would again cause a loss of head pressure in the bilge pump hose, which in turn causes the water in said hose to drain back in to the sea vessel. In operation, the prior systems would experience a continuous cycle of turning on and off the bilge pump, which would either exhaust the sea vessel's battery or significantly increase the cost of electricity. In addition, the constant cycling of the float switch would cause excessive wear and premature failure of parts. Unlike timer based systems for evacuating fluid, this system more efficiently pumps out fluid due establishing running characteristics of the fluid evacuation system. In addition, when characteristics of the system change, such as the degradation's of components e.g. degradation of bilge the pump, the system can alert a necessary device. Sometimes check valves are used in the fluid evacuation systems on the hose used to expel the liquid. These valves are prone to sticking, and they also increase the head pressure necessary to evacuate the fluid. This system would alleviate single points of failure such bad float switches, stuck check valves, bad bilge pumps etc. In addition it alleviates the need for check valves. Accordingly, the instant system learns the appropriate run time lengths based on a plurality of bilge pump run cycles. In some embodiments, the system becomes more energy efficient as the total number of bilge pump run cycles "RT" increase. In some embodiments, the system becomes more efficient as baseline characteristics is calculated from sensory information and calculated by a controller, such as a processor, field-programmable gate array, or other like system operations member. Thus, the instant system can avoid excessive wear, premature failures, and dead batteries due to over running the system.

According to an embodiment of the present invention, a principal object is to provide a bilge pump control unit that includes a sensor for sensing sensory information and a processor in electrical communication with the sensor. The processor performs algorithmic calculation based on the sensory information to create a baseline characteristic for controlling power supplied to a bilge pump.

According to an embodiment, the sensor information includes at least one of current draw information, frequency switch toggling, battery consumption fluctuations, and voltage consumption.

According to yet another embodiment, the sensor information includes at least two of current draw information, frequency switch toggling, battery consumption fluctuations, and voltage consumption.

According to another embodiment, the control unit adjusts a run time duration based on historic fluctuations of a learned high and low current draw value.

According to an embodiment of the present invention, a method for controlling a bilge pump is provided. The method includes A plurality of sensory values of a bilge pump system are monitored. A baseline is created from the plurality of sensory values. Power to the bilge pump is removed based on the baseline.

According to an embodiment, at least a portion of the sensory values are less than the baseline.

According to yet another embodiment, power to the bilge pump is maintained when sensing at least one sensory value less than the baseline for allowing the bilge pump to evacuate a sloshing fluid.

According to still yet another embodiment, the baseline is determined via algorithmic calculation of one or more of at least one of bilge pump system fault, malfunction, degraded performance, and/or errors within a fluid evacuation portion.

According to yet another embodiment, determining, based on the baseline, to switch the bilge pump between on and off.

According to yet another embodiment, additional sensory values are monitored and a trigger time "T1" is adjusted for powering the bilge pump.

According to yet another embodiment, a trigger time "T1" is adjusted for powering the bilge pump based at least in part on characteristics of the baseline.

According to yet another embodiment, a trigger threshold time "T1" is adjusted based at least in part on an elapsed run time duration.

According to yet another embodiment, the baseline is set based at least in part on sensory values related to bilge pump fluid evacuation operation.

According to yet another embodiment, the baseline is set at least in part on sensory values unrelated to fluid evaluation operation.

According to yet another embodiment, a low battery status results in an alert.

According to yet another embodiment, T1 is adjusted based at least in part on a battery level.

According to yet another embodiment, power to the bilge pump is removed due to a plurality of detected normalized sensory values.

According to an embodiment of the present invention, a bilge pump system adaptable for installation and operation with a plurality of unique sea vessels, the bilge pump system includes a bilge pump for evacuating fluid from a sea vessel, at least one fluid level sensor to detect an upper threshold fluid level, a sensor for detecting sensory information of the bilge pump system, and a controller electrically coupled to the sensor. The controller configured to turn on the bilge pump when the at least one fluid level sensor detects the upper threshold fluid level for a time "T1", the controller determines a baseline used in algorithmic calculation for controlling at least one of T1 and a run time duration.

According to yet another embodiment, a visual indicator information visually indicates one or more of the bilge pump system, an end user device, and/or a remote collection station.

According to yet another embodiment, the controller is configured to override operation of the bilge pump system.

According to yet another embodiment, a bilge pump control unit includes a current sensor for sensing current draw of the bilge pump. The system further includes a multi-purpose electronic device that accepts analog and digital inputs, which processes the information in accordance with executed instructions stored in memory and/or through predesigned discreet electrical components and provides necessary outputs to efficiently control fluid levels. The electronic device includes a processor in electrical communication with the current sensor, the processor calculates a run time duration based the current draw of the bilge pump, the bilge pump control unit removes power to the bilge pump based on the calculated run time duration.

According to an embodiment of the present invention, the current sensor is configured to detect fluctuations in current draw amplitude. The detected fluctuations include variations between at least two higher current values and two lower current values. A baseline is developed based on the learned and/or historic sensory values, including learned high and learned low current values.

According to yet another embodiment, the control unit adjusts a trigger time T1 based at least in part on the detected fluctuations in current draw.

According to yet another embodiment, the control unit adjusts the run time duration based on historic fluctuations of higher and lower current draw.

According an embodiment, a method for controlling a bilge pump includes monitoring for a first set of current draw values of the bilge pump. Monitoring for a second set of current draw values of the bilge pump. Removing power to the bilge pump based on the first and second set of current draw values.

According to an embodiment of the present invention, the method includes calculating and/or storing an upper current threshold from the first set of current values and calculating a lower current threshold from the second set of current values.

According to an embodiment of the present invention, power to the bilge pump is maintained when sensing a low current draw value from the bilge pump to evacuate a sloshing fluid, whereby low current draw indicates the bilge pump spinning air. The second set of calculated current draw values consist of the low current draw value.

According to yet another embodiment of the present invention, the first and second current draw values are monitored over a duration of run time. A trigger threshold time "T1" is adjusted based on the elapsed run time duration.

According yet further embodiments of the present invention, low battery status alert is provided. T1 is adjusted based on a battery level for maximizing efficiency and stretching battery life. Power to the bilge pump is removed when a detected current draw normalizes. In a low power battery saving situation, the system should adjust the run time duration of the bilge pump to prevent cavitations, thereby prolonging the battery life. The controller unit performs algorithmic calculation to adjust a baseline characteristic for controlling the run time duration and/or the trigger threshold.

According to some embodiments of the present invention, a time delay T1 is not implemented unless the control unit determines that false triggering is occurring. Such false triggering includes sloshing water which will show itself through alternating high and low current draw values from the bilge pump, as the bilge pump alternates between evacuating water and spinning air.

According to some embodiments, false triggers may include instances where a switch, such as a float switch, is stuck on or off. The instant embodiment can alert or otherwise trigger an alarm to alert. The alert may include without limitation a visual indication on the bilge pump system and/or controller unit. The alert may include an alarm to the end user, including text messages, sms messages, emails, or the like. The alert may include an alarm relayed or otherwise sent to a remote collection station for alerting the marina staff or dock master.

According to yet another embodiment of the present invention, the power to the bilge pump is removed when a low current draw is detected following detection of at least two high current draws and at least one low current draw during a run cycle.

According to a further embodiment of the present invention, a bilge pump system that includes a bilge pump for evacuating fluid from a sea vessel. At least one fluid level sensor to detect an upper threshold fluid level. A current sensor for detecting current draw of the bilge pump. A controller electrically coupled to the current sensor. The controller configured to turn on the bilge pump when the at least one fluid level sensor detects an upper threshold fluid level for a time "T1". The controller determines a high current draw value and a low current draw value for the bilge pump.

According to a yet further embodiment of the present invention, the controller is configured to turn off the bilge pump when the current draw is detected at or below the low current draw value over a duration of time.

According to a further embodiment of the present invention, the controller turns off the bilge pump after the controller detects a plurality of high current draw values and a plurality of low current draw values.

According to yet another embodiment, the controller adjusts the time T1. Further, the controller dynamically determines, via a processor, field-programmable gate array, or other like system operations member, a high current draw value and the low current draw value of the bilge pump.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
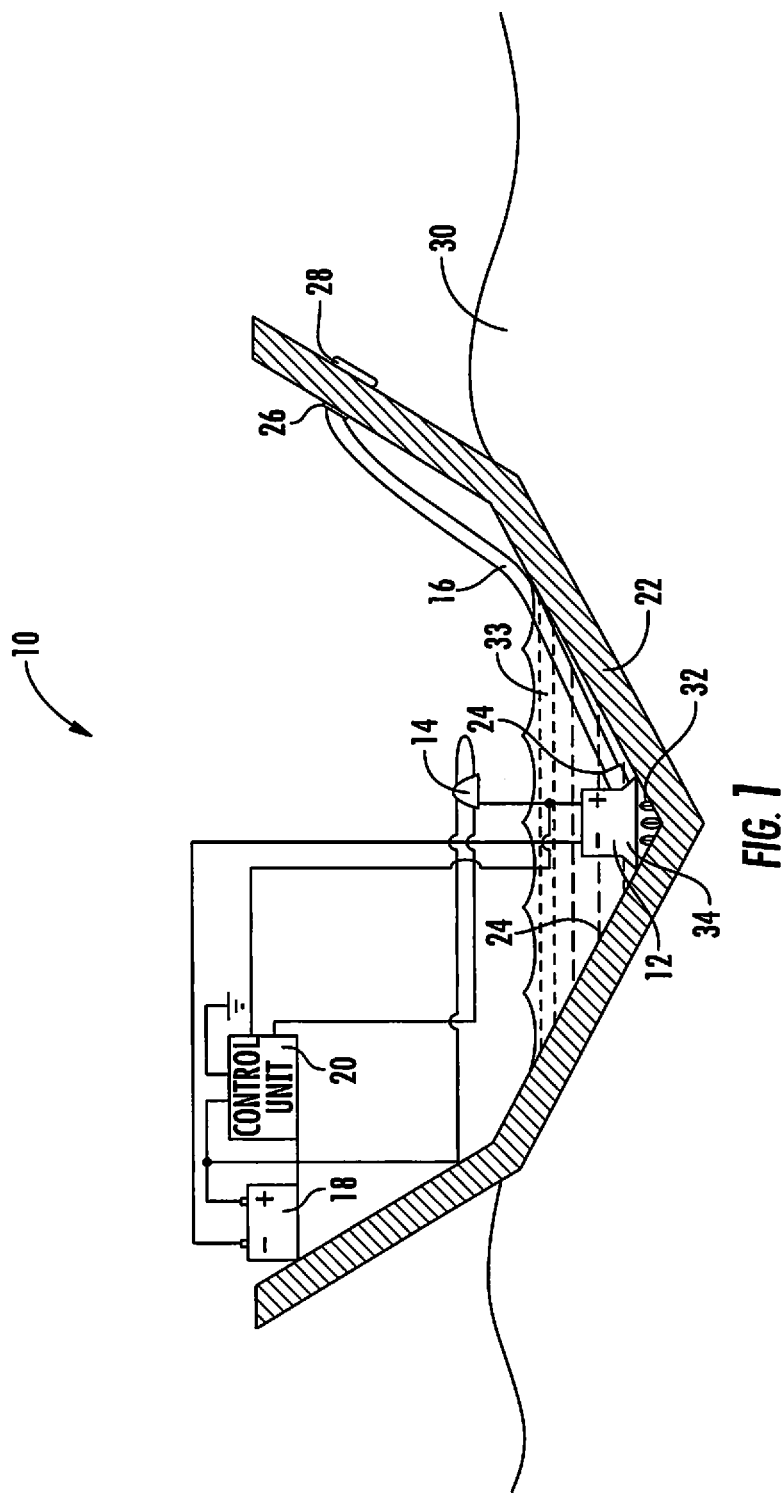
FIG. 1 is a schematic diagram representation of an embodiment of a bilge pump control unit for boats and other vessels in accordance with the principles of the present invention.

The present invention advantageously provides a system and method for evacuating fluid in a sea vessel, including any boat, ship, tank, or the like. More particularly, the invention provides a system and method that is adaptable to any size vessel or bilge pump based on a learned experience gained by sensory information over one or more bursts of time, whereby sensory information may include without limitation current draw, frequency switch toggling information, battery consumption fluctuation information, and voltage consumption information. The present invention contemplates that different types of sea vessels have different types of bilge systems and pumps. Therefore each system has unique run time requirements in order to minimize power consumption over time.

Accordingly, the components of the system have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawings figures in which like reference designators refer to like elements. FIG. 1 shows an exemplary schematic diagram representation of an embodiment of a bilge pump control system for boats and other vessels constructed in accordance with the principles of the present invention and designated generally as system 10. In particular, system 10 is constructed with main components. The main components of system 10 include bilge pump 12, water level sensor 14, bilge pump hose 16, battery 18, and control unit 20. Additionally, two or more water level sensors 14 may be implemented within the spirit and scope of the instant invention to monitor alone or in combination either of a low threshold fluid level and an upper threshold fluid level. The sensors may be implemented having one or more main sensors and one or more auxiliary sensors, wherein the auxiliary sensors become active when a fault is detected in one or more of the main sensors. Faults may occur for example when the one or more sensors become stuck in the on or off positions.

The one or more water level sensors 14 can be any type of water level sensor, including a mechanical or digital float switch, moisture sensor, frequency domain sensor, capacitance probe switch, electrical impedance sensor, fluid proximity detector, pressure sensor switch, or the like. Further, any sensor capable of being implemented to detect the presence of liquid is within the spirit and scope of the present invention.

The control unit 20 is adapted to be connected to the battery 18 or any other available power supply. The control unit 20 may include a self contained power unit (not shown). The control unit 20 may be powered individually by any of battery 18, an available power supply, and the self contained power unit, or any combination thereof.

The bilge pump hose 16 is connected on a first end 24 to the bilge pump 12 and connected on a second end 26 to a discharge fitting 28. In some embodiments, the second end 26 is secured to the discharge fitting 28 above the high threshold fluid level. In some embodiments, the second end 26 is secured to the discharge fitting 28 above the waterline 30.

The bilge pump 12 may include one or more apertures 32 in bilge pump housing 34 to allow fluids to enter the pump. Bilge pump housing 34 is preferably formed of plastic, however, any other suitable material may be used within the spirit of the instant invention.

While the instant invention depicts a single bilge pump 12, two or more bilge pumps 12 may be implemented in some embodiments without departing from the spirit and scope of the instant invention.

The embodiment shown in FIG. 1 depicts control unit 20 embodied in a self contained standalone control unit housing wherein the control unit 20 can be adopted to control both new and existing bilge pump systems. However, it is contemplated that any of the main components may be integrated into a single housing. For example, an exemplary housing (not shown) may contain the control unit 20, bilge pump 12 and/or water level sensor 14. In some embodiments, the housing is water proof.

Still referring to FIG. 1, boat hull 22 is shown. The system 10 is adapted to fit within boat hull 22. In an embodiment, the bilge pump is secured to the inner wall 24 of boat hull 22. Side-to-side rocking, front-to-back rocking, or a combination thereof causes water 33 to slosh within the sea vessel and up the inner wall 24. While the instant embodiment depicts the bilge pump secured to the inner wall 24, the bilge pump can be secured or otherwise mounted anywhere in the boat.

Figure 2:
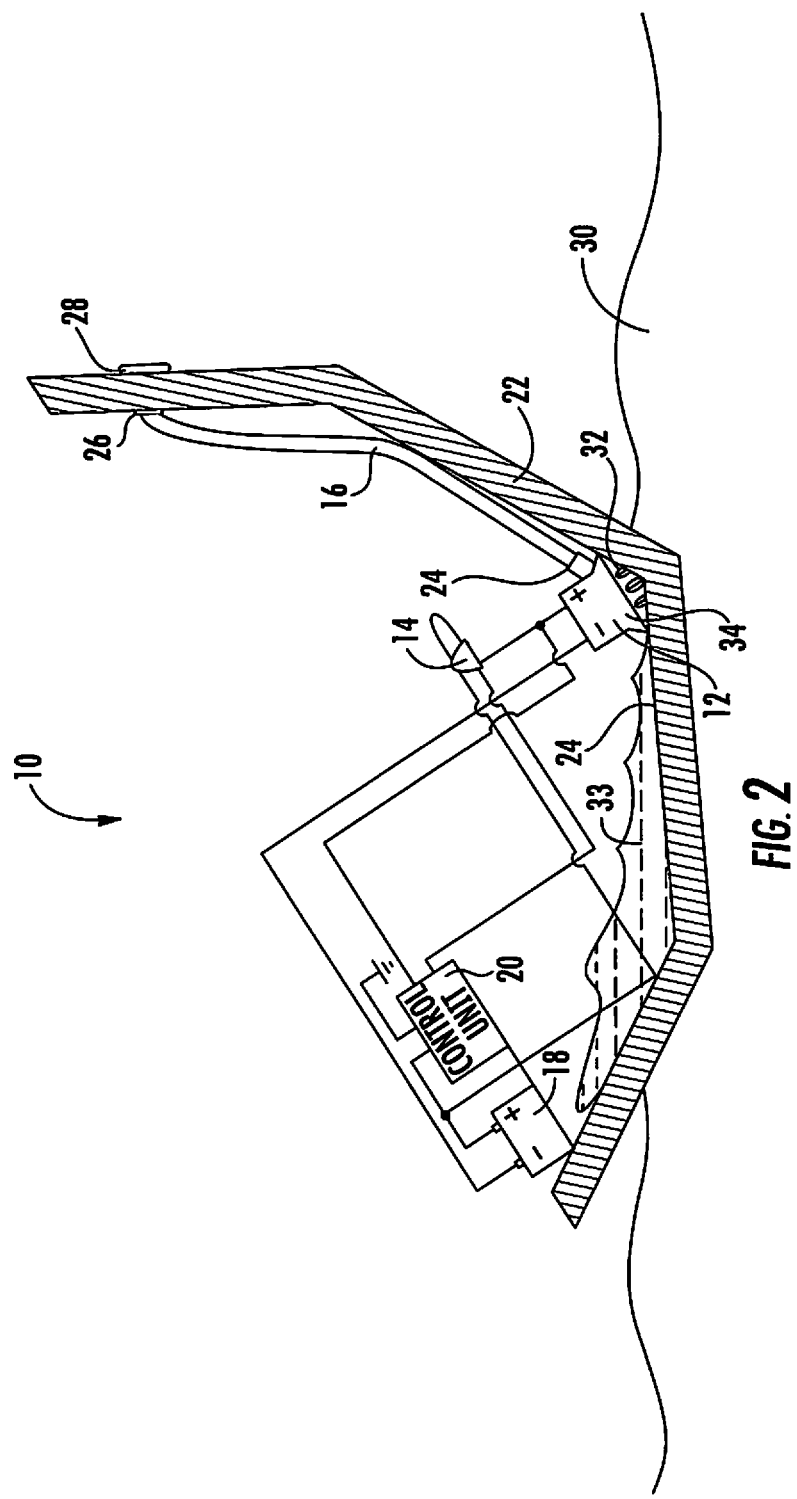
FIG. 2 is a schematic diagram representation of the embodiment of FIG. 1 wherein the boat or other vessel is rocking to a side in accordance with the principles of one embodiment of the present invention.
Figure 3:
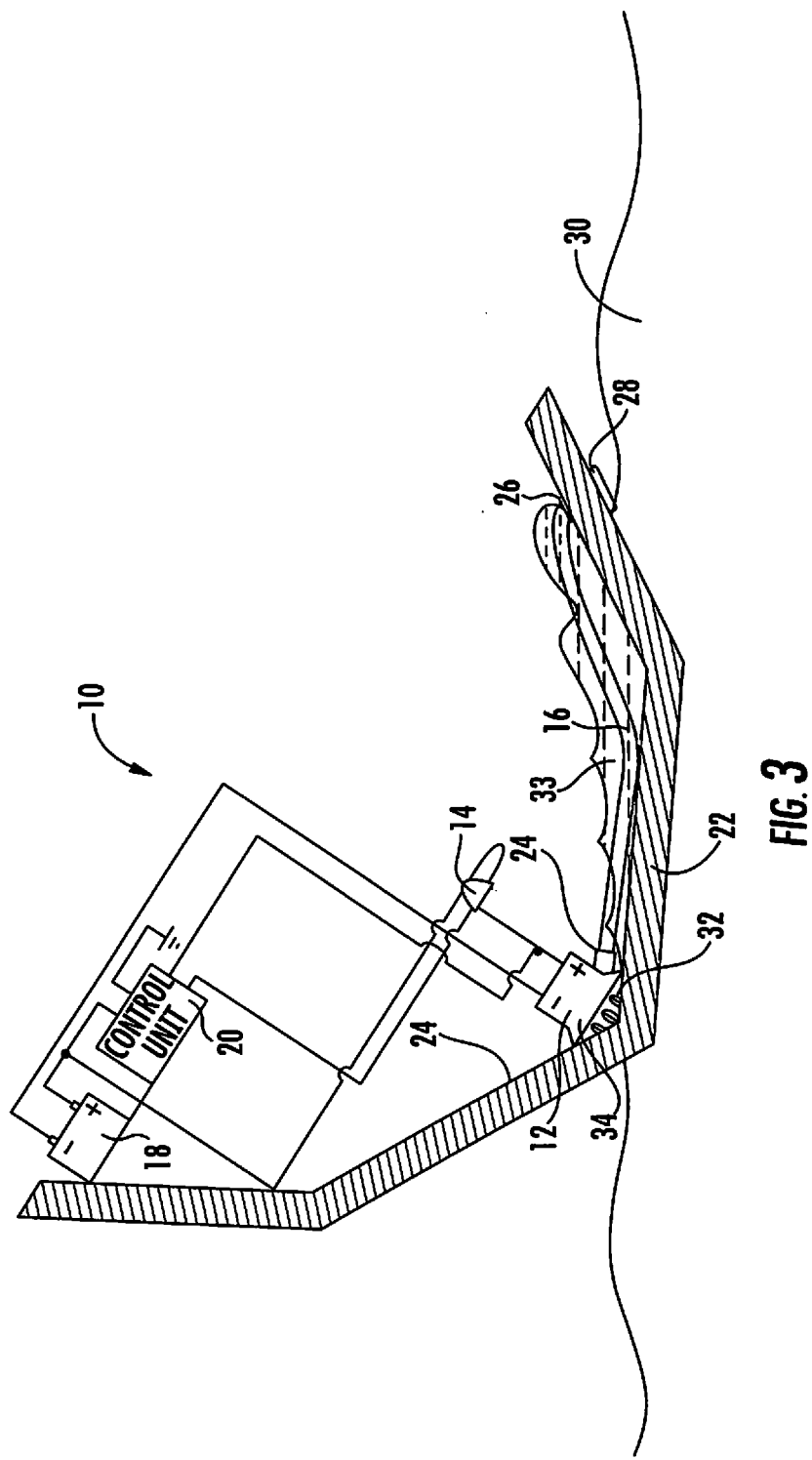
FIG. 3 is a schematic diagram representation of the embodiment of FIG. 1 wherein the boat or other vessel is rocking to another side in accordance with the principles of one embodiment of the present invention.

Referring now to FIGS. 2-3, a schematic diagram representation of the embodiment of FIG. 1 is shown wherein the boat or other vessel is rocking from one side to the other.

In some embodiments, the control unit 20 is used to turn on and off one or more bilge pumps 12. In some embodiments, the control unit 20 is used to monitor the water level in the sea vessel. In some embodiments, the control unit 20 is used in conjunction with an existing bilge pump system. In the case of a faulty sensor the system can modify run characteristics to use a time based system to periodically check for water or other fluids using one or more calculated baseline characteristic and pump out the water or other fluids accordingly.

Figure 4:
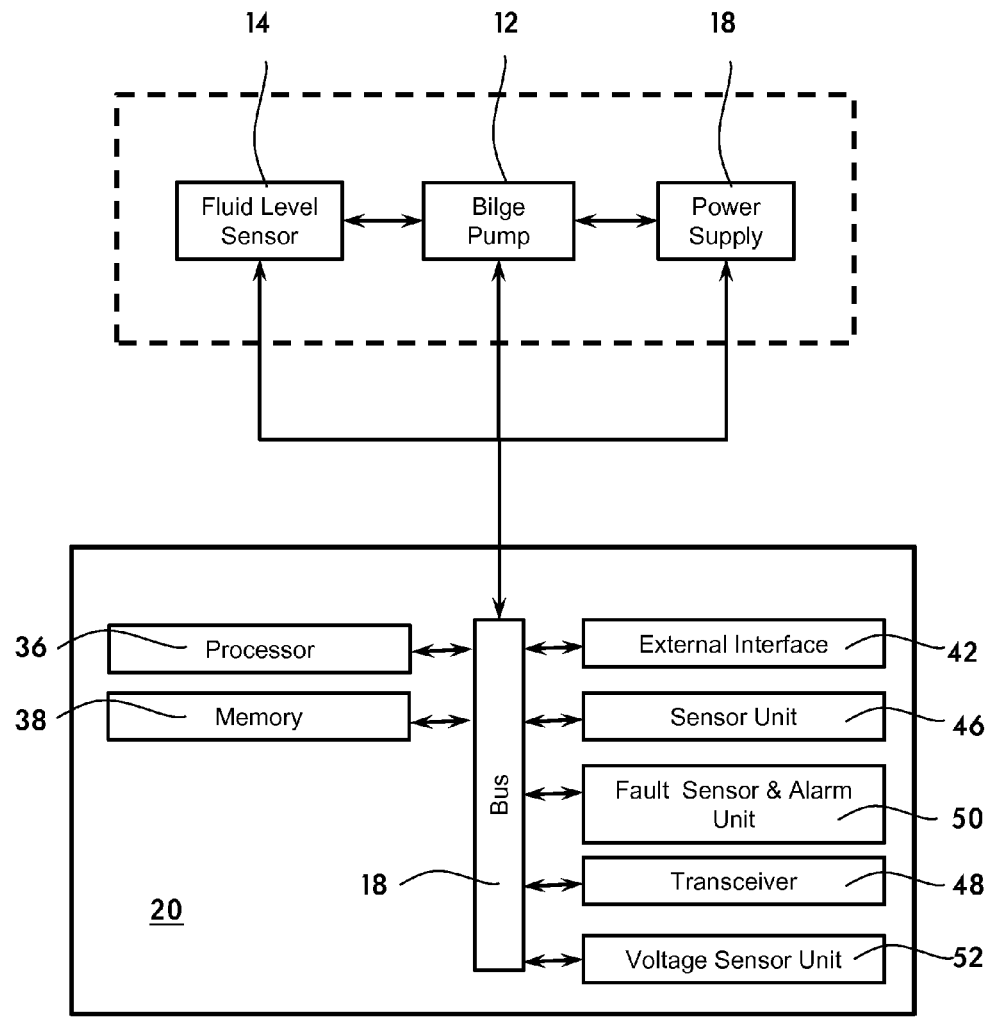
FIG. 4 is a block diagram of an exemplary bilge system control unit in accordance with the principles of one embodiment of the present invention.

Referring now to FIG. 4, a block diagram of an exemplary bilge system control unit 20 is shown. The control unit 20 includes processor 36, memory 38, bus 40, external interface 42, sensor 46, fault alarm 50, transceiver 48, and voltage sensor unit 52. The transceiver 48 may be any transceiver including without limitation transceivers configured to communicate over WiFi, RF, Zigbee, and/or Bluetooth.

The processor 36 is preferably a commercially available digital signal processor, but can be any type of processor, field-programmable gate array or the like. Processor 36 includes memory 38 for storing program instructions, algorithms, filter coefficients, computed data and the like. Memory 38 can be on-chip memory, that is, memory supplied as part of the digital signal processing chip forming processor 18. It is recognized and understood however that memory 19 may include off-chip memory, that is, discrete memory devices such as RAM and ROM chips that are separate from any chip(s) forming processor 36.

The processor 36 is connected to the bus 40 to communicate and transfer digital data between the other components of the bilge system control unit 20.

In an embodiment, a processor 36 operates in accordance with a predetermined program to control the turn-on and turn-off of the bilge pump, as further described herein. In an embodiment, the processor 36 and the sensor unit 46 are in electrical communication.

Still referring to FIG. 4, a sensor unit 46 is shown. The sensor unit 46 is configured to measure sensory data, which may include the current draw of the bilge pump 12, to determine whether the bilge pump 12 is evacuating fluid or whether the bilge pump 12 is spinning air. The current sensor can be any suitable current sensor, including a current sensing resistor. In an embodiment, the processor 36 receives current draw information from the sensor 46 and that information is computed by processor 36 to determine whether to turn-off the bilge pump.

The control unit 20 further includes transceiver 48. The transceiver module 48 is configured to exchange data or connect wirelessly using radio waves to a network, such as the Internet or a base station. The base station may be located at a marina or wherever the sea vessel is housed. In some embodiments, the base station is configured to relay information over the Internet. The transceiver module 48 is operatively coupled to an antenna for transmitting and receiving radio frequency signals.

The control unit 20 further includes a fault alarm 50. The fault alarm 50 can alert to possible faults including boat intrusion alarms, surveillance, or other critical function alarms. The fault alarm is configured to exchange data across the network for the purpose of alerting a user, or the base station, of a triggered fault alarm. For example, the control unit 20 may alert the user of an intrusion alarm by way of SMS message, email, or other notification alerts. The notification alerts may include, for example, push notifications.

In an embodiment, the control unit 20 includes a voltage sensor unit 52 that generates a low battery alert. The voltage sensor unit 52 is configured to cause the exchange of data across the network for the purpose of providing a low battery alert to either the user, the base station, or both.

In some embodiments, the control unit 20 includes one or more lights and/or speakers. The control unit 20 may provide visual and/or audible alert signals via the lights and/or speakers. Said alert signals signal low battery levels and other faults of the system 10.

In some embodiments, the control unit 20 includes an external interface 42 to allow user input and/or interaction with the control unit 20, such as setting bilge pump run time lengths, as further discussed herein. The external interface 42 allows the user to adjust the time that the control unit 20 will turn off the bilge pump during a run cycle. In some embodiments, the external interface 42 allows the user to start and/or stop a learned process for causing the control unit 20 to learn the bilge pump evacuation characteristics and/or baseline characteristics for a sea vessel for which the control unit 20 is coupled.

Figure 5:
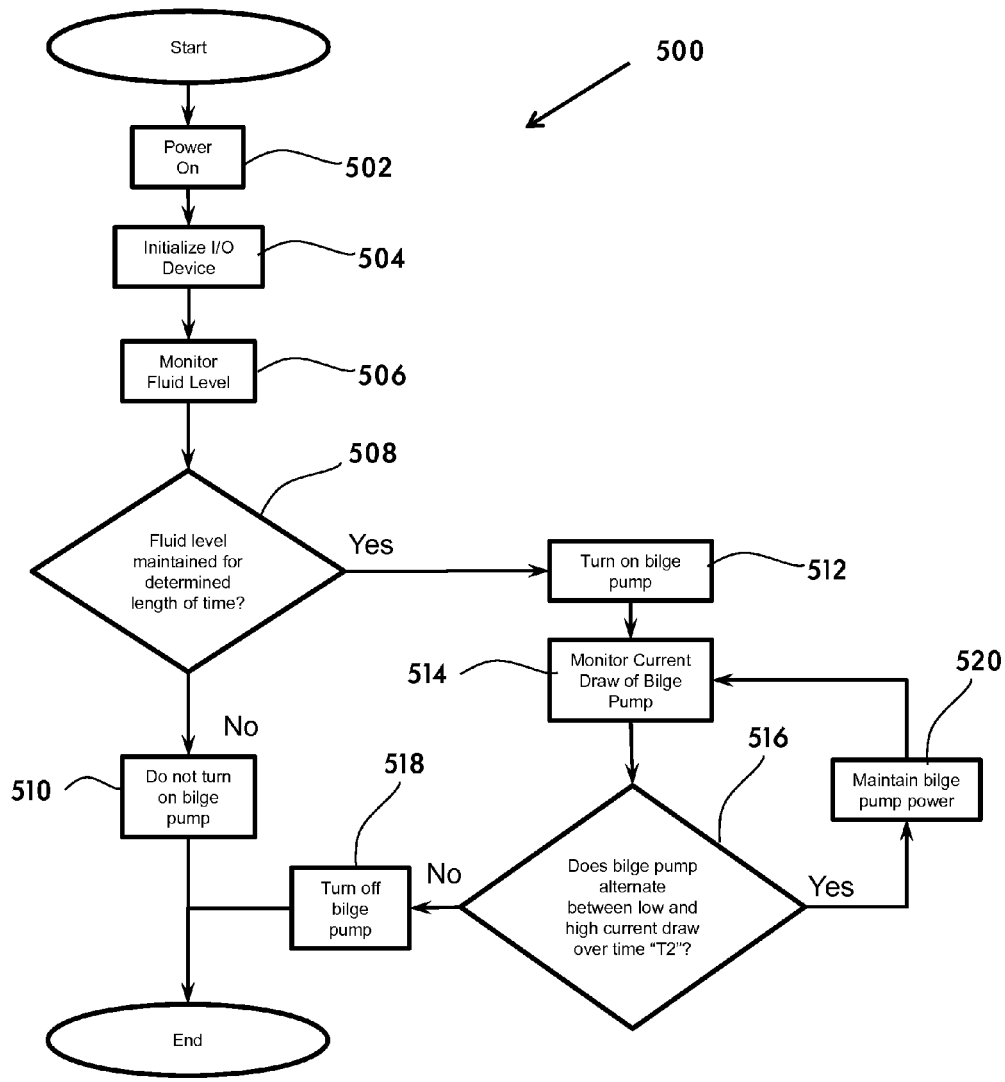
FIG. 5 is a flow chart representing an adaptive learning method for the automated operation of a bilge pump in accordance with the principles of one embodiment of the present invention.

FIG. 5 is a flow chart representing an adaptive learning method 500 for the automated operation of a bilge pump. At step 502, power is applied to portions of the system 10, including the control unit 20 and the one or more water level sensor 14. At step 504, I/O devices are initialized by the processor 36. For example, the external interface 42 is initialized. At step 506, a first water level sensor 14 monitors for an upper threshold fluid level of a fluid contained in the sea vessel. The information from the first water level sensor 14 may be utilized in algorithmic calculation to determine one or more baseline characteristics. The determined baseline characteristics may be stored in memory 38 and accessed by processor 36.

At step 508, the water level sensor 14 determines whether the water level is at an upper threshold fluid level for a determined duration of time "T1". T1 may be set by the control unit 20 based on the algorithmic calculation of the baseline characteristics.

In an embodiment, the baseline characteristics are not pre-set or static at least because static preset baseline characteristics would prevent adaptation of the instant system with a plurality of different sized bilge pumps and sea vessels. In this embodiment, the baseline characteristics are calculated by a controller, such as the processor 36, and particularly may be a current threshold level that is not static or preset, but instead the baseline characteristics are learned, via controller calculations and/or operations. In operation of the instant invention, the baseline characteristics may be implemented to determine whether the sea vessel is rocking or is relatively stable and on flat water. The sensory information from the sensor unit 46 is capable of making said determination. Nevertheless, the instant embodiment may further include an accelerometer, a gyroscope, or other like components, either alone or in combination, which are used by the processor 36 to determine whether the boat is rocking, thereby causing sloshing of water. If the boat is rocking, the system may extend the duration of run time of the bilge pump to compensate for sloshing water, which prevents the immediate turn-off of the bilge pump when the current first drops below a current threshold level. In operation, this prevents turning off the pump early, causing a loop that drains the battery.

In many cases, the sloshing of water in the sea vessel falsely causes the water level sensor 14 to briefly close, or otherwise indicate the presence of water at the upper threshold fluid level, when in fact a false upper threshold fluid level trigger has occurred. For at least this reason, if the water level is not maintained for a determined duration of time T1, at step 510, the bilge pump remains off. T1 may further be adjusted based on algorithmic computation of sensory information in relation to the baseline characteristics.

When a float switch is implemented as the water level sensor 14, the system 10 monitors whether the float switch is maintained in a closed position for the requisite duration of time T1. In some embodiments, the processor 36 takes consecutive reads over a specified duration of time to determine whether the float switch is closed during the entirety of the consecutive reads.

In some embodiments, the upper threshold fluid level is a particular volume of fluid contained in the sea vessel, which may vary dependent upon on the size of any particular sea vessel and/or the pump capacity of the bilge pump 12. The control unit 20 is able to learn baseline characteristics to determine the appropriate duration of run time based on the amount of fluid contained within a threshold level of the sea vessel and the bilge pump capacity. The control unit 20 will adjust the run time of the bilge pump based on the baseline characteristics. In some embodiments, the baseline serves as a basis for measurement or calculation. In some embodiments, the baseline is used as a basis for comparison of sensory information.

The control unit 20 will adjust the baseline characteristics, recalculate the run time duration of the bilge pump and adjust the run time duration of the bilge pump. The run time duration of the bilge pump may be calculated and adjusted in real-time or near real time and adjusted dynamically during operations of the bilge pump. The dynamic adjustment is based on learned operational conditions of the present and/or historic conditions of the system. For example, the sensory information will allow the system to determine whether water in the sea vessel is sloshing due to a side-to-side rocking, front-to-back rocking, or the like of the sea vessel or whether little to no sloshing is occurring due to calm weather conditions. For instance, the system is able to determine whether water is sloshing by detecting one or more spikes or drops in current draw from the bilge pump, wherein when multiple spikes or drops occur, the system determines that the water is sloshing and that the bilge pump should continue to run. For another example, the control unit 20 may compare past sensory information and run time durations to the sensory information related to a present bilge pump operation. Accordingly, the baseline is dynamically adjusted to account for present weather conditions and characteristics. In some embodiments, the dynamic adjustment occurs during bilge pump operations based on sensory information.

In some embodiments, the upper threshold fluid level is the level at which at least one sensor 14 is closed or otherwise detects fluid. In some embodiments, T1 is defined as two or more seconds. Any desirable duration of time T1 may be set by the manufacturer, the user, the base station, or the like. Thus, T1 may include any time less than two seconds. However, in some embodiments, T1 may be adjustably set by the control unit 20 depending on the adaptive learning of the system 10. For example, the processor 36 calculates T1 based on a sampling of a plurality of bilge pump run cycles. Short runs may be based on false triggering and the control unit 20 may adjust T1 as a consequence thereof.

In some embodiments, the control unit 20 monitors whether the trigger is accurately set. The control unit 20 will learn over a plurality of bilge pump run cycles whether the duration of time T1 is accurately set. In an embodiment, the control unit 20 will monitor the duration of time of the bilge pump run cycle. The control unit 20 monitors for rapid triggering of the bilge pump turn-on and turn-off. When the control unit 20 detects rapid triggering, the control unit adjusts T1 for future run cycles. Rapid triggering includes triggering over a specified period of time. For example, rapid triggering may occur over a period of seconds, minutes and/or hours.

In some embodiments, when the control unit 20 detects rapid triggering, the control unit temporarily adjusts T1 to account for present conditions. In some embodiments, the temporarily adjusted T1 will be readjusted after a triggering event, after a duration of time, or a combination thereof.

In some embodiments, the control unit 20 monitors the current draw during each bilge pump run cycle. The control unit 20, via processor 36, adjusts T1 as a result of detecting a low current draw immediately and/or shortly after turning on the bilge pump 12. In addition, the control unit 20 recalculates the run time duration of the bilge pump based on a comparison of baseline characteristics against sensory information.

In some embodiments, the control unit 20 operates in parallel to an existing bilge pump system on a sea vessel, which includes controlling the turn-off of the bilge pump 12. Accordingly, the bilge pump will turn on and off based on both the existing system settings and the control unit 20. For example, the system may turn off as a result of both a turn-off signal from the existing system and a turn-off signal from the control unit 20.

In some embodiments, the control unit 20 will override the existing system. In which case, the control unit 20 turns off the pump when necessary to prevent over running the existing bilge pump system. Further, the control unit 20 can override the existing system to allow the bilge pump to continue to run when the existing bilge pump system would have otherwise turned off the bilge pump.

As water is removed from the sea vessel during a run cycle, the pulse width of a high current draw decreases and the pulse width of a low current draw increases. In some embodiments, when the pulse width of a low current draw is greater than the pulse width of a high current draw, the control unit 20 prevents subsequent triggers from turning on the bilge pump for a specified period of time.

In some embodiments, the processor 36 receives bilge pump 12 current draw information. The processor 36 uses the current draw information to determine the appropriate duration of time T1, which prevents false triggering events. For example, the processor 36 determines whether the current draw of the bilge pump 12 during one or more bilge pump run cycles "R1" indicates signaling of a true positive trigger, which is determined by comparing R1 against bilge pump run cycle samples "RS". In some embodiments, RS includes a number of samples greater than the number of run cycles of R1. In some embodiments, the current draw information can be converted, via the processor, into a baseline characteristic used for algorithmically calculating start time delay durations and run time durations.

At step 512, the bilge pump turns on if the water level sensor 14 is closed or otherwise detects a threshold level of water for a duration of time T1. Once on, at step 514, the control unit 20, via one or both of current sensor unit 20 and processor 36, will monitor and determine whether the bilge pump is alternating between low current draw and high current draw over a time "T2". A determination is made whether the bilge pump alternates between low and high current draw over time T2, which operates to prevent turning off the bilge pump early as water is sloshing causing multiple bilge pump current drops. The processor 36 will adjust the turn-off time "T3" of the bilge pump based on the monitored sensory information compared against baseline characteristics of the system, sensory information including alternation between bilge pump low current draw and high current draw over time T2. For example, as the current draw of the bilge pump begins to normalize to a low current draw, the turn-off time T3 will be adjusted and/or dynamically calculated and the bilge pump may be turned off. Alternatively, as the current draw of the bilge pump begins to normalize to either at or below a learned baseline characteristic, the controller will turn off fluid pumping from the bilge pump.

In some embodiments, control unit 20 adjusts T3 based on the current draw of the active bilge pump run cycle, whereby T3 is used to determine the shut off time of the active run cycle. In other embodiments, control unit 20 adjusts T3 for future run cycle turn-off times. T3 may be algorithmically calculated by processor 36 utilizing sensory information in comparison to the one or more dynamically and/or statically adjusted baseline characteristics.

In some embodiments, the control unit 20 measures the width between two or more high current draws to determine whether to turn off the bilge pump.

In some embodiments, the control unit 20 measures the width between two or more low current draws to determine whether to turn off the bilge pump.

In some embodiments, the control unit 20 measures sensory information in comparison to a dynamically learned baseline characteristic to determine whether to turn off the bilge pump.

In an embodiment, the instant invention monitors the peaks and valleys of the current draw during each individual bilge pump cycle to determine whether a significant amount of water is sloshing in the sea vessel. If the water is sloshing, the bilge pump will alternate between high and low current draws. More specifically, as water sloshes from one side to the other, the spinning bilge pump will remove a portion of the water sloshing from one side of the sea vessel to the other. When sloshing is occurring, the bilge pump will spin air until the water sloshes across the sea vessel. Accordingly, the control unit 20 will monitor the spikes and drops in the current draw, the spikes and drops in current draw detected by one or more sensors 46. At step 518, as the spikes and drops in current draw normalizes to a low current draw, the control unit 20 will turn-off the bilge pump. In an embodiment, the bilge pump is turned off after a delay, which ensures that all water is removed and not sloshing. Additionally, the control unit 20 may dynamically adjust the baseline characteristics. For example, when sloshing is detected during the delay, the control unit 20 will continue to run the bilge pump. In some embodiments, such sloshing may be detected by the control unit 20 when two or more spikes and drops in current draw are detected.

At step 520, the bilge pump continues to pump because the current draw continues to either (1) remain high; or (2) alternates between low current draw and high current draw, in which case the system will continue to monitor the current draw of the bilge pump until the current draw normalizes at a low current draw.

At step 522, a determination is made by the processor 36 whether to continue to monitor for the one or more sensors 46 to detect the upper threshold fluid level.

Figure 6:
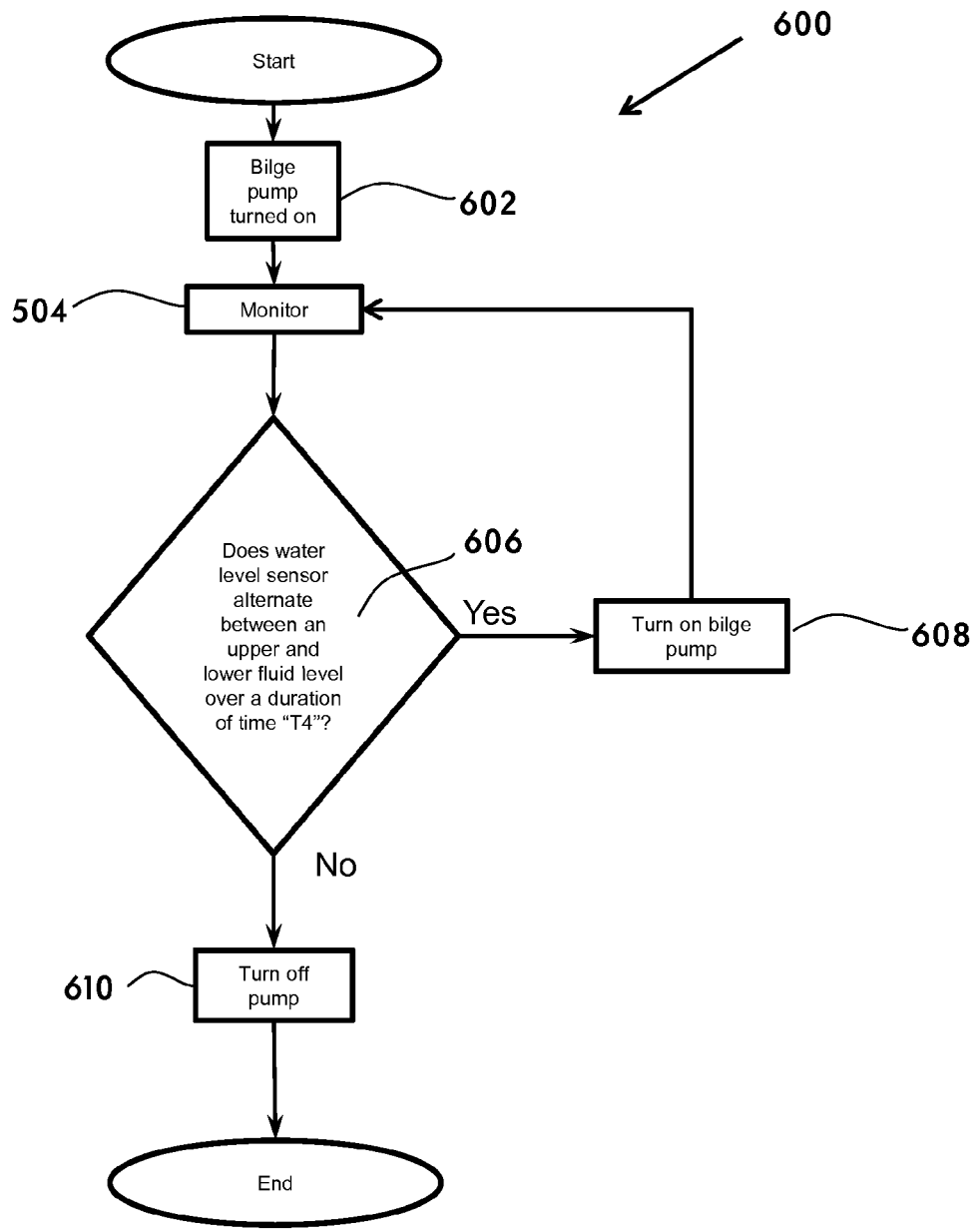
FIG. 6 is a flow chart representing a method for monitoring alternations between a fluid level sensor open and closed position in accordance with the principles of one embodiment of the present invention.

Referring now to FIG. 6, a method 600 for monitoring alternations between a float switch open and closed position is shown. At step 602, the bilge pump is turned-on. The bilge pump may be turned-on based on the sensor detecting water at the upper threshold fluid level for duration of time T1. Alternatively, in a particular embodiment, merely triggering the sensor at the upper threshold fluid level causes the bilge pump to be turned-on, regardless of the duration of time T1.

At step 604, the control unit 604 monitors for water level sensor signaling that switches between an upper and lower threshold fluid level. At step 606, the control unit 20 determines, via one or more water level sensors 14, whether the change between the upper and lower threshold fluid levels over a duration of time "T4" is due to sloshing water. At step 608, the bilge pump will remain on when the control unit 604 detects alternating upper and lower threshold fluid level signaling over the duration of time T4.

In some embodiments, the control unit 20 detects alternating at or between the upper and lower threshold fluid level. The control unit 20 will determine whether to turn off the bilge pump 12 or allow the bilge pump 12 to remain on.

In some embodiments, the control unit 20 detects a low current draw in comparison to a current threshold level, the control unit 20 will determine whether to turn off the bilge pump 12 or allow the bilge pump 12 to remain on.

At step 610, the control unit 604 turns off one or more bilge pumps 12. In some embodiments, the control unit 604 determines that the water level sensor signals have normalized, indicating that the water in the sea vessel has been evacuated sufficiently.

Figure 7:
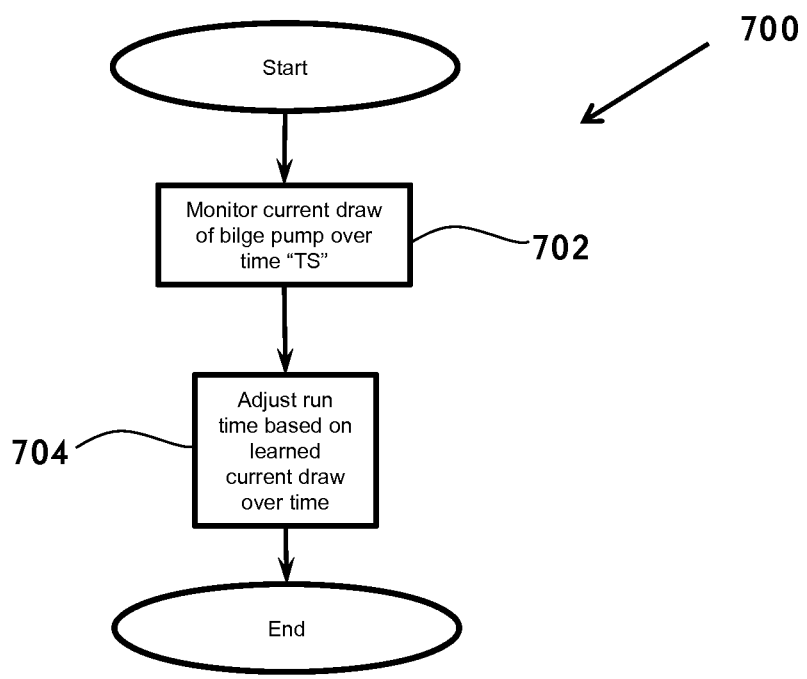
FIG. 7 is a flow chart representing an adaptive learning method for adjusting run time based on current draw over time in accordance with the principles of one embodiment of the present invention.

Referring now to FIG. 7, an adaptive learning method 700 for adjusting run time based on current draw over time is shown. At step 702, the control unit 20 monitors current draw of the bilge pump over a duration of time "T5". At step 704, the control unit 20 adjusts run time lengths of the bilge pump 12 based on the current draw of the bilge pump from one or more historical bilge pump run cycles.

Figure 8:
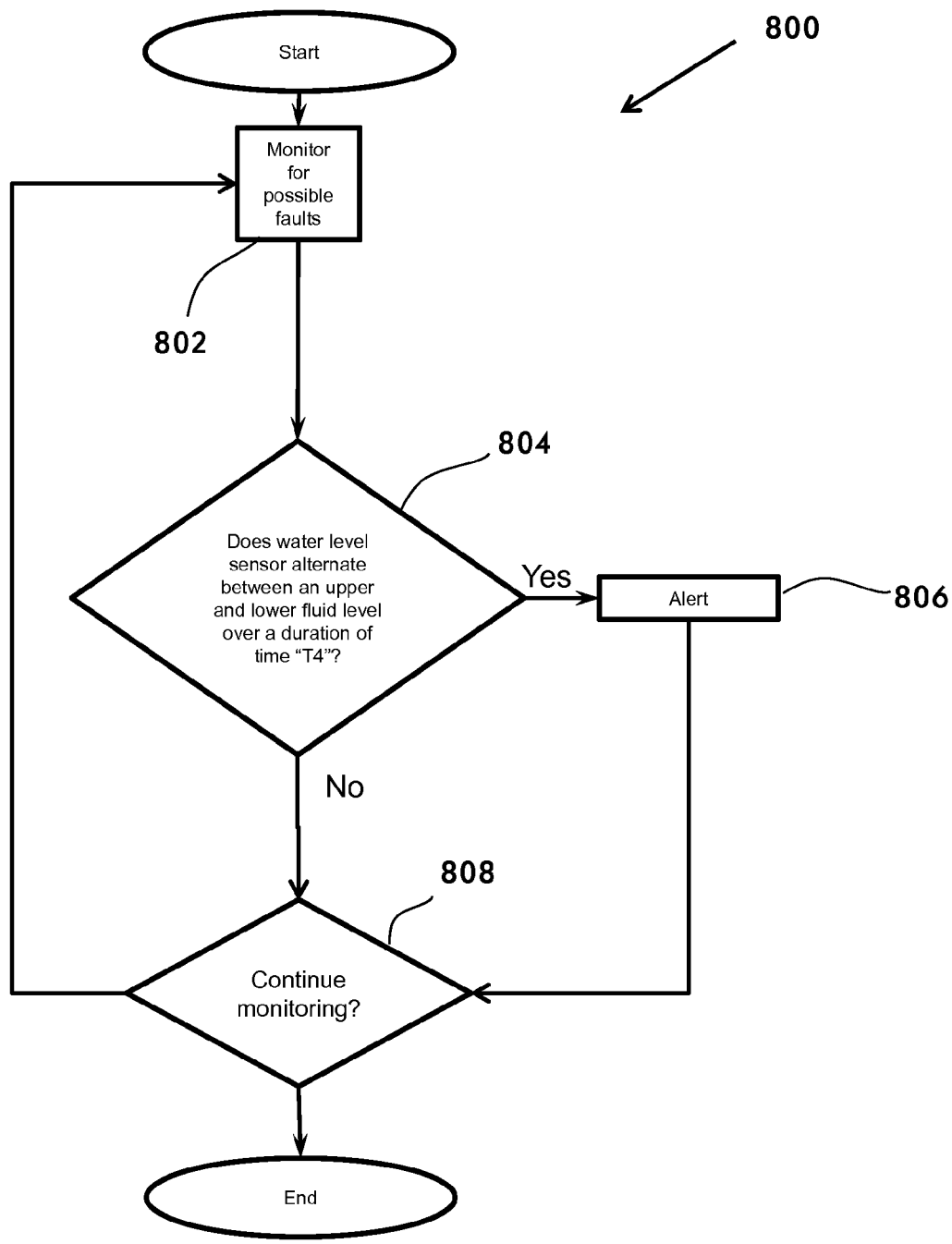
FIG. 8 is a flow chart representing a method for monitoring faults in accordance with the principles of one embodiment of the present invention.

Referring now to FIG. 8, a method 800 for monitoring faults is shown. At step 802, the control unit 20 monitors for faults. At step 804, the control unit 20 determines whether a fault is detected. At step 806, a fault is detected and an alert is sent to alert of the fault. The fault could include an intruder on or near the boat, low battery levels, faulty bilge pumps, faulty water level sensors 14, or other faults to the system 10. At step 808, the control unit 20 determines whether to continue monitoring for faults. In the event of a detected fault, the system has the capability to alter the operation of the fluid evacuation system to a fail safe operation. The fail safe operation may include altering operation to a purely time based system. The purely time based system optionally may use historically calculated baseline characteristics to determine bilge pump start/stop times, bilge pump run time durations, and/or bilge pump wait times. For example, the fail safe mode can be implemented when a fault detects a switch is stuck on.

Figure 9:
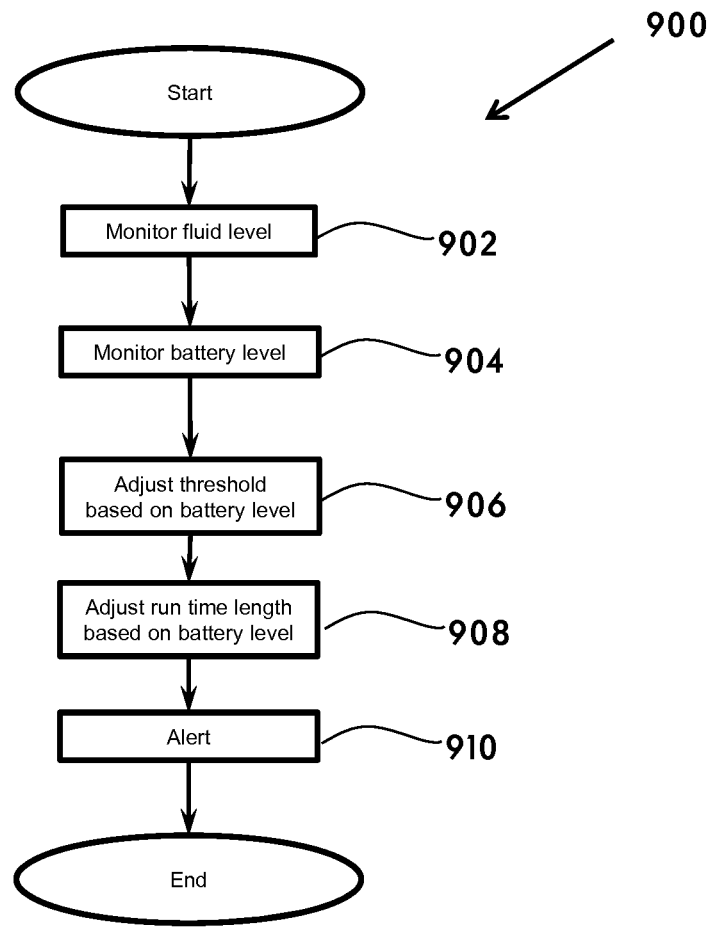
FIG. 9 is a flow chart representing a method for adjusting run time length based on an available battery level in accordance with the principles of one embodiment of the present invention.

Referring now to FIG. 9, a method 900 for adjusting run time length based on an available battery level. At step 902, the control unit 20 monitors the fluid level in the sea vessel. At step 904, the control unit 20 monitors the battery level in the sea vessel 904. At step 906, the control unit 20, via processor 36, adjusts the upper threshold fluid level based on determined battery level. At step 908, the control unit 20 adjusts the run time duration of the bilge pump 12 based on the battery level. In some embodiments, the run time duration is based on one or more of the battery level, sensory information, and frequency the switching toggling. At step 910, an alert is sent over the network to alert of the low battery level.

In an embodiment, the control unit 20 is constructed and configured to be implemented to work in parallel to existing bilge pump systems. In other embodiments, the control unit 20 operates at the highest level of control. In order to accomplish this task, the control unit 20 monitors and evaluates baseline characteristics, including without limitation the amplitude of the current draw of the bilge pump. The control unit 20 learns the difference between the current draw when the bilge pump is evacuating water and when the bilge pump is spinning air because different bilge pumps exhibit different current draws when both evacuating water and spinning air. This is a learned function that can be programmed by the user, manufacturer, or learned by operation of the bilge pump over time. It is also noted that the current draw of the bilge pump when evacuating water varies depending on the amount of total water being evacuated. In some embodiments, the control unit 20 takes into account the variations in the current draw that occurs as a result of the amount of water being evacuated. In other words, the control unit 20 learns, based on the current draw of each particular system, whether a high or low amount of water is being evacuated by the bilge pump. The control unit 20 turns off the bilge pump when the current draw indicates a low amount of water being evacuated by the bilge pump. Unlike previous systems, the instant controller unit 20 is adaptable for any system, regardless of the size of the sea vessel or the bilge pump.

In some embodiments, the control unit 20 learns the water evacuation capabilities and/or efficiency of the bilge pump based on the current draw and historic run cycle data, including without limitation the run time per cycle.

In some embodiments, the control unit 20 monitors the time between bilge pump run cycles. When the control unit 20 determines successive triggers causing multiple run cycles of the bilge pump in a duration of time, and monitors alternating high and low current draws of the bilge pump 12, then the control unit 20 will increase the run time duration of the bilge pump (which relates to the turn off time) to prevent fluid in the bilge pump hose 16 from returning into the sea vessel. The control unit 20 may also adjust determined upper and lower current draw threshold values. In some embodiments, the run time duration is not a set time duration, but instead determined dynamically by the control unit 20 as the bilge pump is expelling fluid from the sea vessel based on present and/or historic baseline characteristics algorithmically calculated from sensory information and/or detected system faults.

Figure 10:
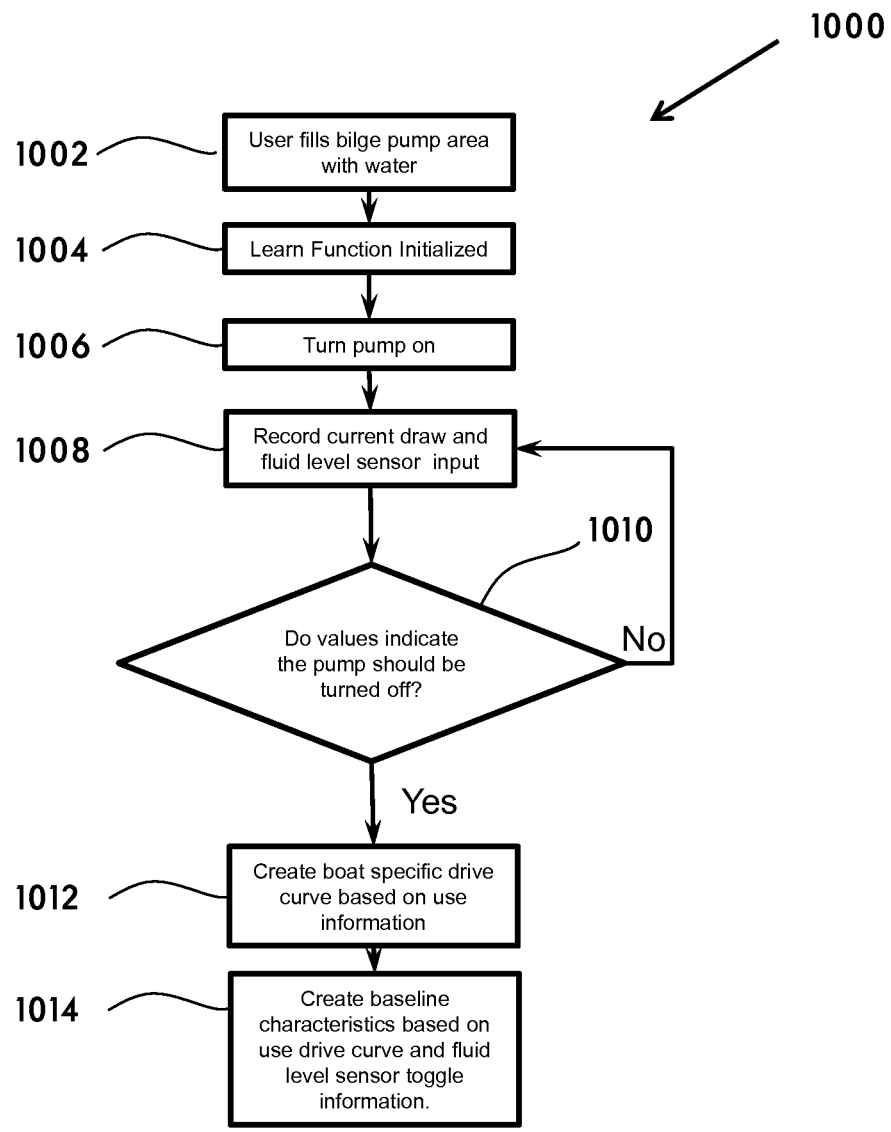
FIG. 10 is a flow chart representing a method for creating user implemented baseline characteristics in accordance with the principles of one embodiment of the present invention.

Referring now to FIG. 10, a flow chart representing a method 1000 for creating user implemented baseline characteristics is shown. The present invention may preferably be implemented to learn baseline characteristics when a bilge pump system and/or control unit 20 is installed on a sea vessel. At step 1002, the user fills the hull of the sea vessel, or area near the bilge pump, with water. The user will initiate a learn function. In some embodiments, the user will initiate the learn function by pressing a start button. The learn function may be initiated before or after the user fills the hull with water. According to the present embodiment, at step 1004, the learn function is initialized after a sufficient amount of water is placed into the sea vessel. At step 1006 the pump is turned on to evacuate water or other fluids from the sea vessel. At step 1008, Baseline information is recorded and/or calculated. The baseline information derived from sensory and/or fault information is stored into memory 38. Baseline information may include without limitation current draw information and switch sensor information. The switch sensor information may include toggle information relating to frequency switch toggling of a switch sensor. In some embodiments, the baseline information includes changes in battery consumption. In some embodiments, the baseline information includes voltage draw. The baseline information characteristics may include information obtained from sensor 46 or additionally from fault sensor unit 50. At step 1010, a determination is made whether values indicate that the pump should be turned off. For example, current draw information may indicate a need to turn off the pump, in accordance with the spirit and scope of the present invention. Alternatively, a user received input is used to determine that the pump should be turned off. If a determination is made that the values do not indicate that the pump should be turned off, the system continues to record information. At step 1012, a determination is made that the bilge pump should be turned off. A sea vessel specific drive curve based on use information is created. At step 1014, a baseline is created based on the use drive curve and toggle information.

Figure 11:
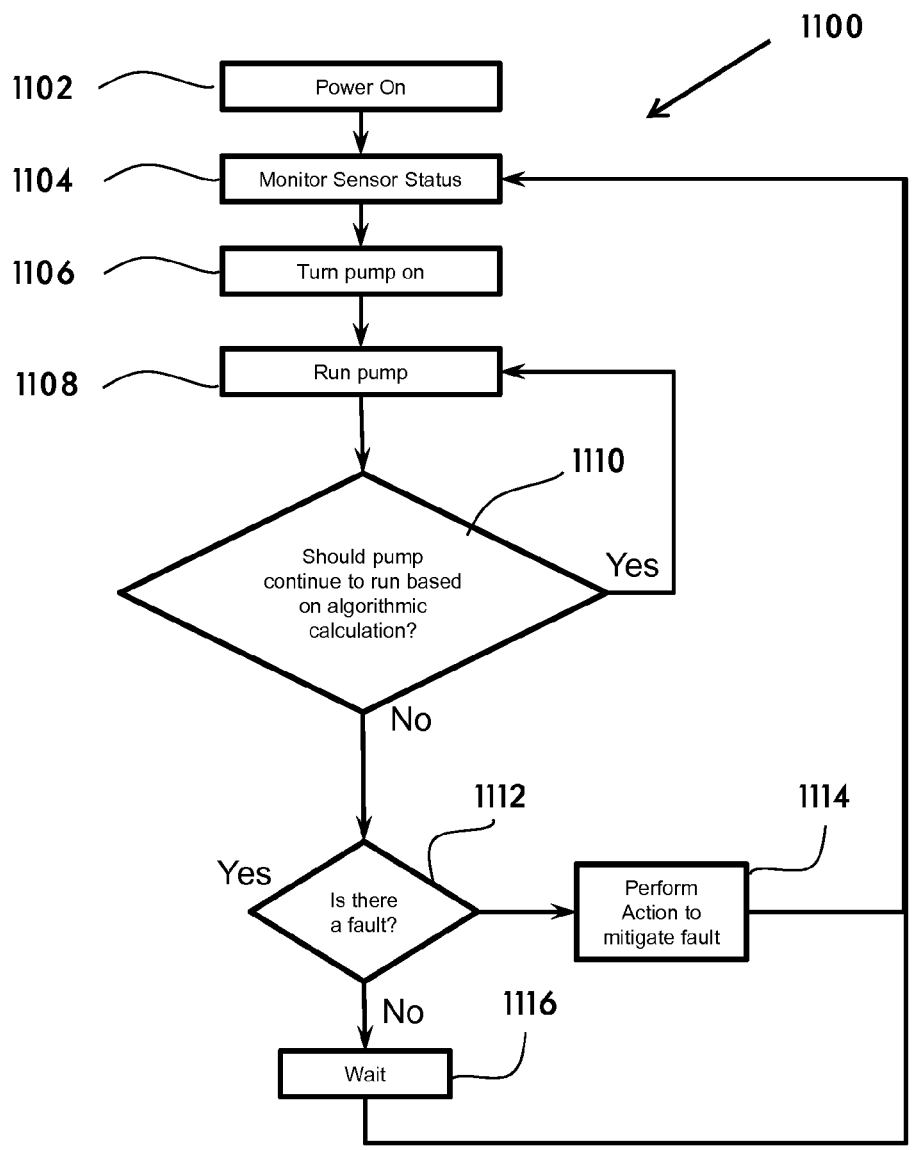
FIG. 11 is a flow chart representing a method for controlling power to a bilge pump based on algorithmic calculation in accordance with the principles of one embodiment of the present invention.

Referring now to FIG. 11, a flow chart representing a method 1100 for controlling power to a bilge pump based on algorithmic calculation is shown. At step 1102, power is applied to the control unit 20. At step 1104, the control unit 20 begins to monitor sensor status information. At step 1106, the pump is turned on based on triggering of a sensor indicating a threshold level of water. At step 1108, the bilge pump is run to evacuate water. At step 1110, a determination is made whether to continue running the bilge pump based on an algorithmic calculation. If a determination is made to continue to run the bilge pump, the bilge pump will continue to run. If a determination is made that to turn off the bilge pump, power to the bilge pump power is removed and the bilge pump is turned off. At step 1112, a determination is made whether there is a fault. At step 1114, an action is performed to mitigate the fault. For example, a fault may be detected indicating that an upper level threshold is stuck in an on position. In this example, an auxiliary sensor may be implemented to prevent false positives due to a malfunctioning sensor. At step 1116, the control unit 20 will wait a period of time before continuing to monitor sensor status.

Figure 12:
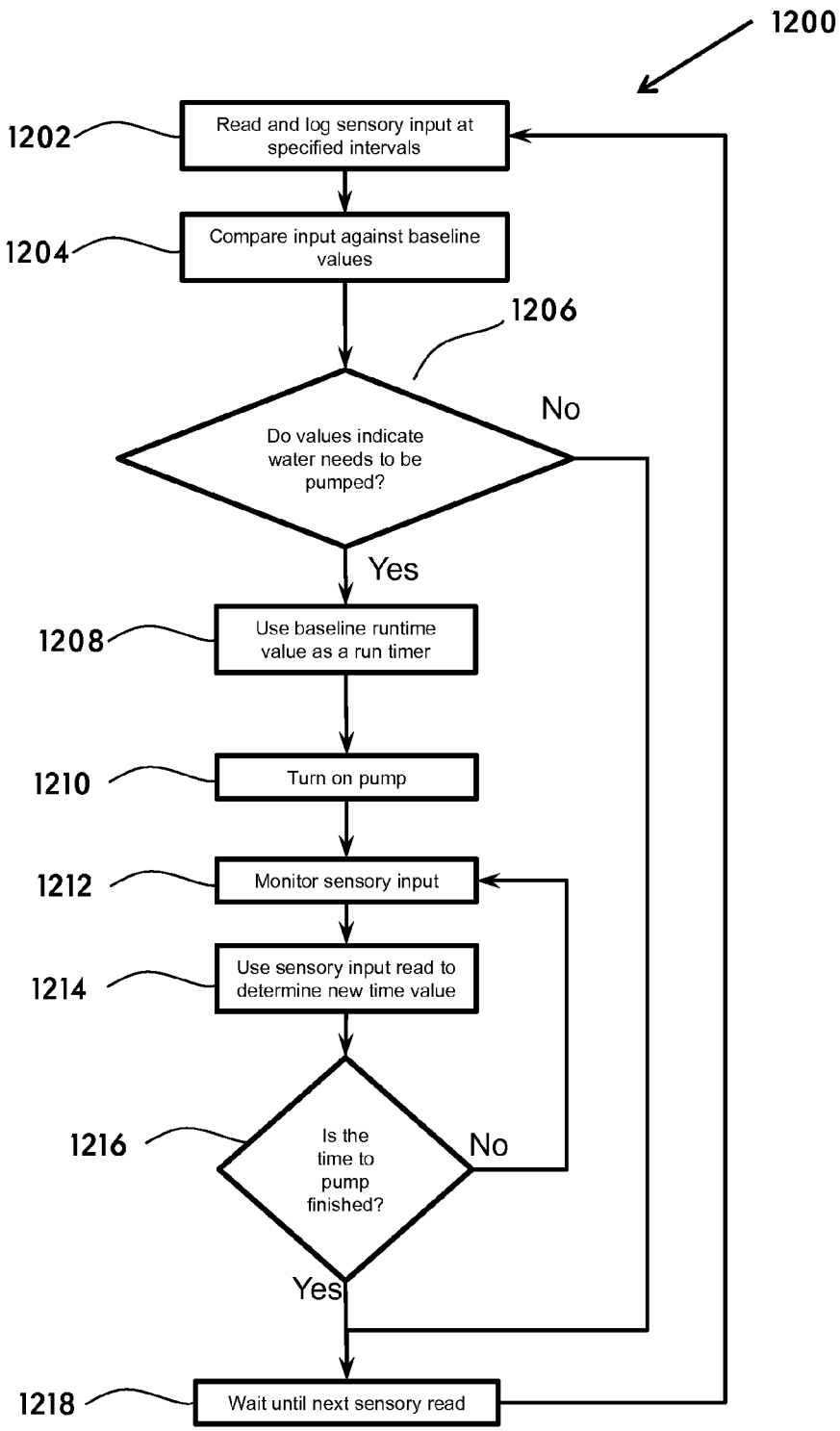
FIG. 12 is a flow chart representing a method for controlling power to a bilge pump based on a comparison against baseline characteristics in accordance with the principles of one embodiment of the present invention.

FIG. 12 is a flow chart representing a method 1200 for controlling power to a bilge pump based on a comparison against baseline characteristics in accordance with the principles of one embodiment of the present invention. At step 1202, a processor will read and log sensory input at specified intervals. At step 1204 sensor information is compared against baseline values. At step 1206 a determination is made whether sensor information values indicate that water needs to be pumped from the sea vessel. If water or other fluids do not need to be pumped from the sea vessel, than the system waits until the next sensory read function. At step 1208, a bilge pump run timer is based on baseline runtime value. In some embodiments, the baseline runtime value is calculated from baseline information values using algorithmic calculations. At step 1210, the bilge pump is turned on. At step 1212, the sensory information from the sensor 46 is monitored. The sensor information may be stored into memory, or otherwise used by the system. At step 1214, a new runtime value is determined based on new and/or historic sensor information from sensor 46. The new runtime value is calculated based on algorithmic calculations. A step 1216, a determination is made whether the pump is finished pumping. If the pump is not finished pumping, the sensor 46 will continue to monitor sensory information, in accordance with the spirit and scope of the present invention. If the pump run time has expired, the power to the bilge pump will be removed. At step 1218, the system will wait until a next sensory read to determine whether to turn the bilge pump on.

The threshold levels taught herein are not necessarily static threshold levels. In some embodiments, the threshold levels are static. In some embodiments, the threshold levels are based on an algorithm stored in memory 38. In some embodiments, the threshold levels are adjusted based on the control unit 20, via processor 36. Said adjustments may be stored into memory 38.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention. It will be readily apparent that various changes may be made thereto without departing from the spirit and scope of the disclosure or sacrificing all of its material advantages, the examples hereinbefore described merely being preferred or exemplary of the disclosure.

The terminology used herein is for the purposes of describing exemplary embodiments only. Such terminology is not intended to be limiting in any regard.

As used herein, the singular forms "a", "an" and "the" may be intended to include the plural forms, unless the context clearly indicates otherwise.

As used herein, when the term "and/or" is used, it shall include all combinations of one or more of the associated described items.

As used herein, spatially relative terms may be intended to encompass the orientation of the different orientations of the system or device as it relates to the orientations depicted in the Figures. Such terms may include "inner", "outer", "above", "upper", "beneath", "below", "lower", and the like.

As used herein, an element, portion, layer, or other member referred to as being "on", "engaged to", in "communication with", "connected to", "secured to", "mated with" or "coupled to" another element, portion, layer, or member thereof, may be directly or indirectly on, engaged, in communication, connected, secured, mated, or coupled to the other element, portion, layer, or member. Other similar words to describe relationships should be interpreted in like fashion. For example, between versus directly between, as well as adjacent versus directly adjacent.

As used herein, the terms "comprises", "comprising", "including", and "having" are inclusive and therefore specifically the presence of stated features, integers, steps, operations, elements, components, or groups, or a combination thereof.

What is claimed is:

1. A bilge pump system comprising:
a pump for evacuating fluid,
at least one fluid level sensor,
a current sensor,
a bilge pump control unit,
the control unit measures a current draw and a running time of the pump over one or more pumping cycles; and
the control unit turns on the pump if the fluid level sensor is closed or otherwise detects a threshold level of water for a time T1, and turns off the pump after a time T3 when a low current draw is detected; and
the control unit supplies power to the bilge pump while monitoring the current draw of the pump, and after sensing a low current draw the control unit determines whether the bilge pump alternates between low and high current draw over time T2; if no alternating current is detected the pump is turned off after time T3, if alternating current is detected the pump continues to run for an adjusted time T3 based upon the sensed alternating currents.

2. The bilge pump control unit of claim 1, wherein the control unit recognizes degradation or failure of the bilge pump and compensates by adjusting one or more of time T1 or T3.

3. The bilge pump system of claim 1 wherein the control unit recognizes a degradation or failure of the fluid level sensor and compensates by switching to a time based control; wherein when a high current draw is detected the bilge pump control unit will supply power to the bilge pump for either a time of T4 or until the current is detected below a low current threshold.

4. The bilge pump system of claim 1, wherein one or more of low current draw level, high current draw level, T2, or T3 is adjusted in part on sensory values unrelated to fluid evacuation operation.

5. The bilge pump system of claim 1, further comprising adjusting one or more of a low current level, a high current level, T2, or T3 based on previously measured values of low current level, high current level, T2, or T3.

6. The bilge pump control unit of claim 1 wherein fluid level sensor information defines a volume of fluid contained in a sea vessel, and that volume is used to determine a running time T1.

7. A bilge pump system comprising:
a pump for evacuating fluid;
at least one fluid level sensor;
a current sensor;
a bilge pump control unit that controls the operation of the pump; wherein
when the fluid level sensor indicates the presence of fluid at an upper threshold fluid level, the control unit turns the pump on for a time T1 or until a low current level is detected; and
the control unit monitors a battery level in the system, and adjusts one or more of the upper threshold or time T1 based on the battery level.

8. The bilge pump control unit of claim 7, wherein the control unit recognizes degradation or failure of the bilge pump and compensates by adjusting one or more of T1 or a run time of the pump.

9. The bilge pump system of claim 7 wherein the control unit recognizes a degradation or failure of the fluid level sensor and compensates by switching to a time based control; wherein when a high current draw is detected the bilge pump control unit will supply power to the bilge pump for either a time of T4 or until the current is detected below a low current threshold.

10. The bilge pump system of claim 7, further including adjusting run time T1 at least in part on sensory values unrelated to fluid evacuation operation.

11. The bilge pump system of claim 5, further comprising alerting of a low battery status.

12. The bilge pump system of claim 7, further comprising deriving run time information from sensors and storing said information in a memory, and adjusting T1 based at least in part on previous pump run times T1.

13. The bilge pump control unit of claim 7 wherein fluid level sensor information defines a volume of fluid contained in a sea vessel, and that volume is used to determine a running time T1.

14. A bilge pump system comprising:
a pump for evacuating fluid;
at least one fluid level sensor;
a current sensor;
a bilge pump control unit; and
the control unit turns on the pump when the fluid sensor detects a presence of fluid for a time T1; and
the control unit monitors run times of one or more pumping cycles over time and detects a rapid triggering of bilge pump turn-on and turn-off based upon the run times and detected current draw; and
the control unit adjusts T1 for future run cycles based on the detected rapid triggering.

15. The bilge pump system of claim 14, further comprising a visual indicator for visually indicating on at least one of the bilge pump system, an end user device, and a remote collection station.

16. The bilge pump system of claim 14, wherein the control unit is configured to override operation of the bilge pump system.

17. The bilge pump control unit of claim 14 wherein fluid level sensor information defines a volume of fluid contained in a sea vessel, and that volume is used to determine a running time T2.

* * * * *